United States Patent
Kuo et al.

(10) Patent No.: US 8,600,956 B2
(45) Date of Patent: Dec. 3, 2013

(54) METHOD, APPARATUS AND COMPUTER PROGRAM PRODUCT FOR PROVIDING CONFLICTING POINT OF INTEREST INFORMATION

(75) Inventors: Cynthia Y. Kuo, Mountain View, CA (US); Carl Snellman, Belmont, MA (US); Peter L. Mikelsons, San Francisco, CA (US); Amol Khadilkar, Union City, CA (US); Kenneth Tracton, Palo Alto, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/210,726

(22) Filed: Aug. 16, 2011

(65) Prior Publication Data

US 2013/0046738 A1   Feb. 21, 2013

(51) Int. Cl.
   *G06F 17/30*   (2006.01)
(52) U.S. Cl.
   USPC .......................................... 707/690; 715/771
(58) Field of Classification Search
   USPC ............................ 707/690; 701/208; 715/771
   See application file for complete search history.

(56) References Cited

U.S. PATENT DOCUMENTS

| 7,831,381 B2 | 11/2010 | Thota |
| 7,840,345 B2 | 11/2010 | Miyoshi |
| 2008/0163073 A1 | 7/2008 | Becker et al. |
| 2009/0106681 A1* | 4/2009 | Gupta et al. ................... 715/771 |
| 2010/0023259 A1 | 1/2010 | Krumm et al. |
| 2010/0198814 A1 | 8/2010 | Petersen et al. |

OTHER PUBLICATIONS

Nokia; "Maps User Guide" written and published by Nokia, 2008, 21 pages.*
*Interning at Facebook: Who Goes Where When (and Why It Matters)*; 4 pages; (available at <http://www.facebook.com/note.php?note_id=10150282681968920>) visited Sep. 19, 2011.
POI Factory—*Red Light Cameras*; 3 pages; (available at <http://forums.gpsreview.net/viewtopic/php?t=13835> ) visited Oct. 17, 2011.

* cited by examiner

*Primary Examiner* — Monica Pyo
(74) *Attorney, Agent, or Firm* — Alston & Bird LLP

(57) ABSTRACT

A method to provide an improved method for providing first POI information and second POI information which conflicts with the first POI information, and providing an accuracy confidence level of each of the first POI information and the second POI information. Embodiments may further solicit feedback (e.g. a selection) from a user regarding the user's determination of which of the first POI information and the second POI information is accurate. The method may also include updating the accuracy confidence level of each of the first information and the second information in response to receiving the selection.

14 Claims, 13 Drawing Sheets

Point-of-Interest

105 Euclid Ave
Buffalo, NY

Name: Mel's Diner
Category: Restaurant
Cuisine: Various
Hours: Su-Th 8am – 9pm
Fr-Sa 8am-11pm
Phone: 704-555-1212

METHOD, APPARATUS AND COMPUTER PROGRAM PRODUCT FOR PROVIDING CONFLICTING POINT OF INTEREST INFORMATION

TECHNICAL FIELD

Example embodiments of the present invention relate generally to presentation of point-of-interest information and, in particular to the presentation of conflicting point-of-interest information together with a mechanism by which crowd-sourced information may be used to resolve conflicts.

BACKGROUND

The modern communications era has brought about a tremendous expansion of wireline and wireless networks. Computer networks, television networks, and telephone networks are experiencing an unprecedented technological expansion, fueled by consumer demand. Wireless and mobile networking technologies have addressed consumer demands while providing more flexibility and immediacy of information transfer.

Navigation information has increasingly become available via online map services available over the internet or other networks. These services may provide directions, time and distance estimations, location information, and point-of-interest (POI) information among other information. These services may be available on both mobile and traditionally non-mobile devices. Non-mobile devices, such as desktop computers, that access mapping services provide information to a user for printing or viewing to better understand a route or location. Mobile devices, such as cellular telephones, tablet computers, personal digital assistants, etc., may be used as navigation devices as a user follows a route laid out on by the mapping service or to a destination depicted on the mobile device.

The mapping service provider may provide POI information corresponding to a location where the POI information may include any information a person may find to be of interest or useful about the location. While some POI information may not change, other POI information may be more volatile (e.g., when the POI information includes information about a store or restaurant). For example, a store or restaurant at a particular location may close or move such that the POI information corresponding to that location provided by the mapping service may be outdated or inaccurate. It may be desirable to have a mechanism to accurately update POI information as necessary.

BRIEF SUMMARY

In general, example embodiments of the present invention provide a method, apparatus and computer program product for providing first POI information and second POI information which conflicts with the first POI information, and providing an accuracy confidence level of each of the first POI information and the second POI information. Embodiments may further solicit feedback from a user regarding the user's determination of which of the first POI information and the second POI information is accurate.

In particular, the method of example embodiments provides for providing first point-of-interest information, providing second point-of-interest information, where the second point-of-interest information conflicts with the first point-of-interest information, and providing an accuracy confidence level of each of the first point-of-interest information and the second point-of-interest information. The method may also include receiving a selection of one of the first point-of-interest information or the second point-of-interest information, where the selection indicates that the respective point-of-interest information is accurate. The method may also include updating the accuracy confidence level of each of the first information and the second information in response to receiving the selection. The method may further include directing presentation of the first point-of-interest information and directing to cease presentation of the second point-of-interest information in response to the accuracy confidence level of the first point-of-interest information exceeding a threshold value in response to receiving a selection of the first point-of-interest information. The method may also include identifying the source of the selection and assigning a weight factor to the selection in response to identifying the source of the selection. The method may further include updating the accuracy confidence level of each of the first point-of-interest information and the second point-of-interest information in response to receiving the selection based at least in part on the weight factor of the selection. The accuracy confidence level of each of the first and second point-of-interest information is represented by a format chosen from the group consisting of at least one of a percentage, a pie-chart, a selection-count, a transparency level, a size, or a color.

According to another embodiment of the present invention, an apparatus is provided. The apparatus may include at least one processor and at least one memory including computer program code. The at least one memory and the computer program code may be configured to, with the at least one processor, cause the apparatus to at least provide first point-of-interest information, provide second point-of-interest information, where the second point-of-interest information conflicts with the first point-of-interest information, and provide an accuracy confidence level of each of the first point-of-interest information and the second point-of-interest information. The apparatus may further be caused to receive a selection of one of the first point-of-interest information or the second point-of-interest information, where the selection indicates that the point-of-interest information is accurate. The apparatus may further be caused to update the accuracy confidence level of each of the first point-of-interest information and the second point-of-interest information in response to receiving the selection. The apparatus may also be caused to direct presentation of the first point-of-interest information and be caused to direct to cease presentation of the second point-of-interest information in response to the accuracy confidence level of the first point-of-interest information exceeding a threshold value in response to receiving a selection of the first point-of-interest information. The apparatus may still further be caused to identify the source of the selection and assign a weight factor to the selection. The accuracy confidence level of each of the first and second point-of-interest information may be represented by a format chosen from the group consisting of at least one of a percentage, a pie-chart, a selection-count, a transparency level, a size, or a color.

A further embodiment of the invention may include a computer program product including at least one computer-readable storage medium having computer-executable program code instructions stored therein, the computer-executable program code instructions may include program code instructions for directing presentation of first point-of-interest information, program code instructions for directing presentation of second point-of-interest information, where the second point-of-interest information conflicts with the first point-of-interest information, and program code instructions for directing presentation of an accuracy confidence level of each of the first point-of-interest information and the second point-of-interest information. The computer program product may further include program code instructions for receiving a selection for one of the first point-of-interest information or the second point-of-interest information, where the selection indicates that the information is accurate. The computer program product may further include program code instructions for updating the accuracy confidence level of each of the first point-of-interest information and the second point-of-interest information in response to receiving the selection. The computer program product may also include program code instructions for identifying the source of the selection and assigning a weight factor to the selection in response to identifying the source. The computer program product may further include program code instructions for updating the accuracy confidence level of each of the first point-of-interest information and the second point-of-interest information in response to receiving the selection based at least in part on the weight factor of the selection. The accuracy confidence level of each of the first and second point-of-interest information may be represented by a format chosen from the group consisting of at least one of a percentage, a pie-chart, a selection-count, a transparency level, a size, or a color.

Another example embodiment of the present invention may provide an apparatus comprising means for directing presentation of first point-of-interest information, means for directing presentation of second point-of-interest information, where the second point-of-interest information conflicts with the first point-of-interest information, and means for directing presentation of an accuracy confidence level of each of the first point-of-interest information and the second point-of-interest information. The apparatus may further include means for receiving a selection of one of the first point-of-interest information or the second point-of-interest information, where the selection indicates that the respective information is accurate. The apparatus may further include means for updating the accuracy confidence level of each of the first point-of-interest information and the second point-of-interest information in response to receiving the selection. The apparatus may further include means for directing presentation of the first point-of-interest information and direct to cease presentation of the second point-of-interest information in response to the accuracy confidence level of the first point-of-interest information exceeding a threshold value in response to receiving a selection of the first point-of-interest information. The apparatus may still further include means for identifying the source of the selection and assign a weight factor to the selection. The accuracy confidence level of each of the first and second point-of-interest information may be represented by a format chosen from the group consisting of at least one of a percentage, a pie-chart, a selection-count, a transparency level, a size, or a color.

BRIEF DESCRIPTION OF THE DRAWINGS

Figure 1:
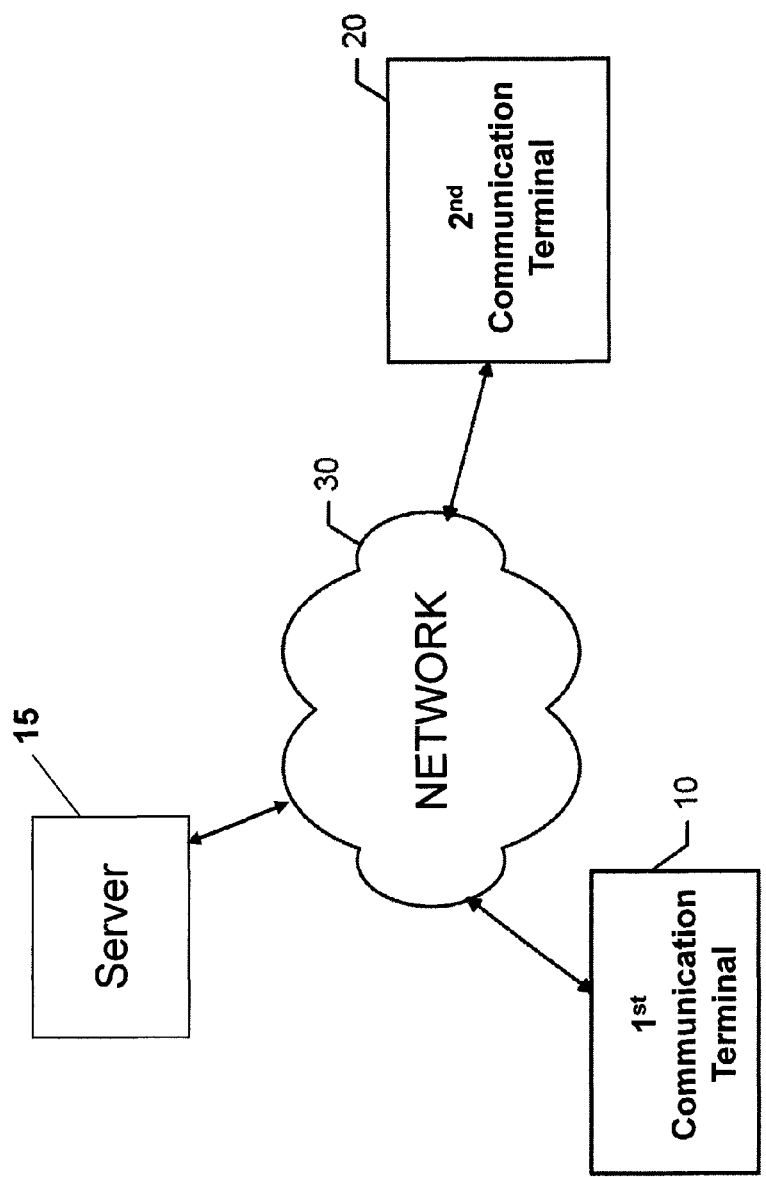
Figure 2:
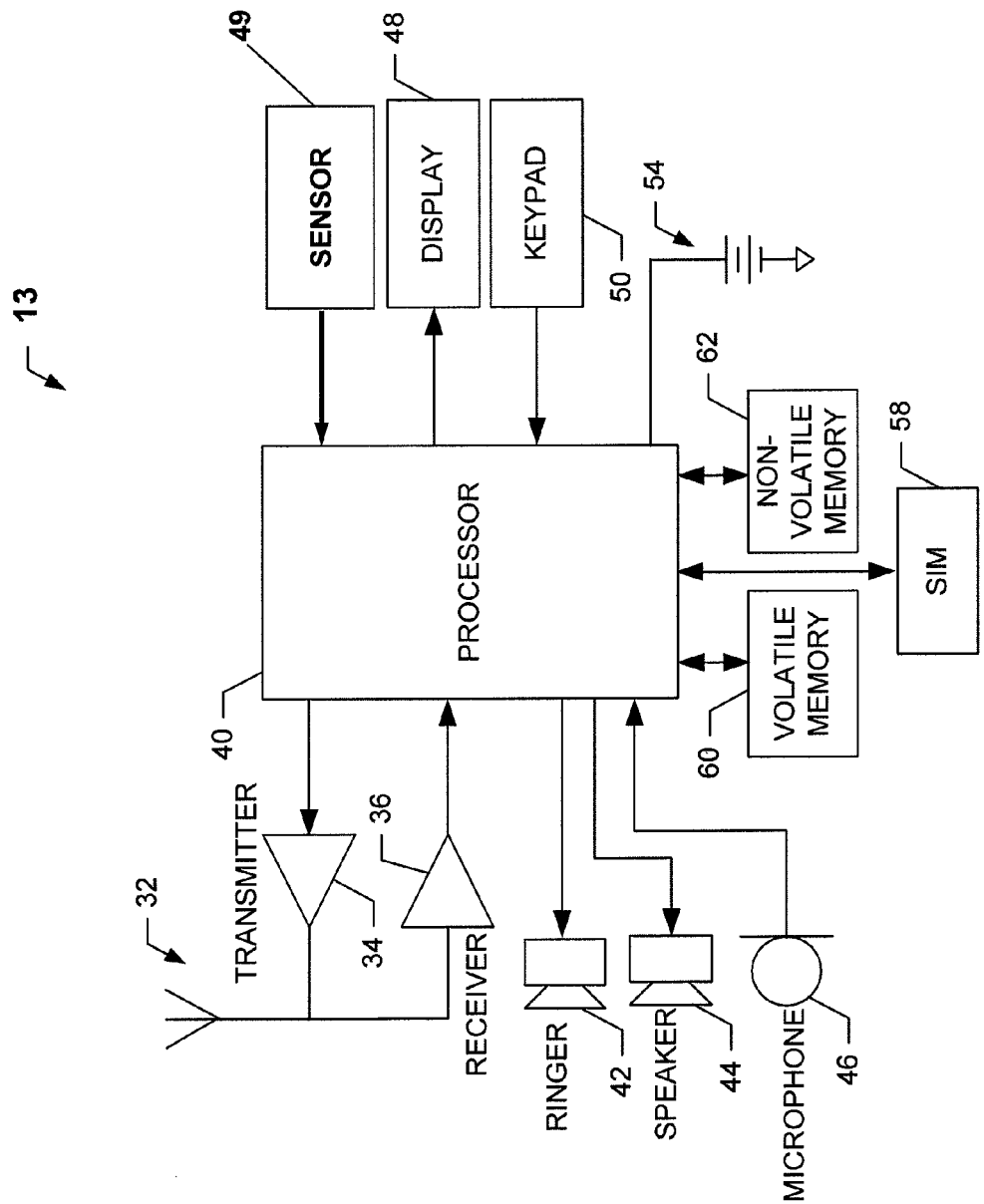
Figure 4:
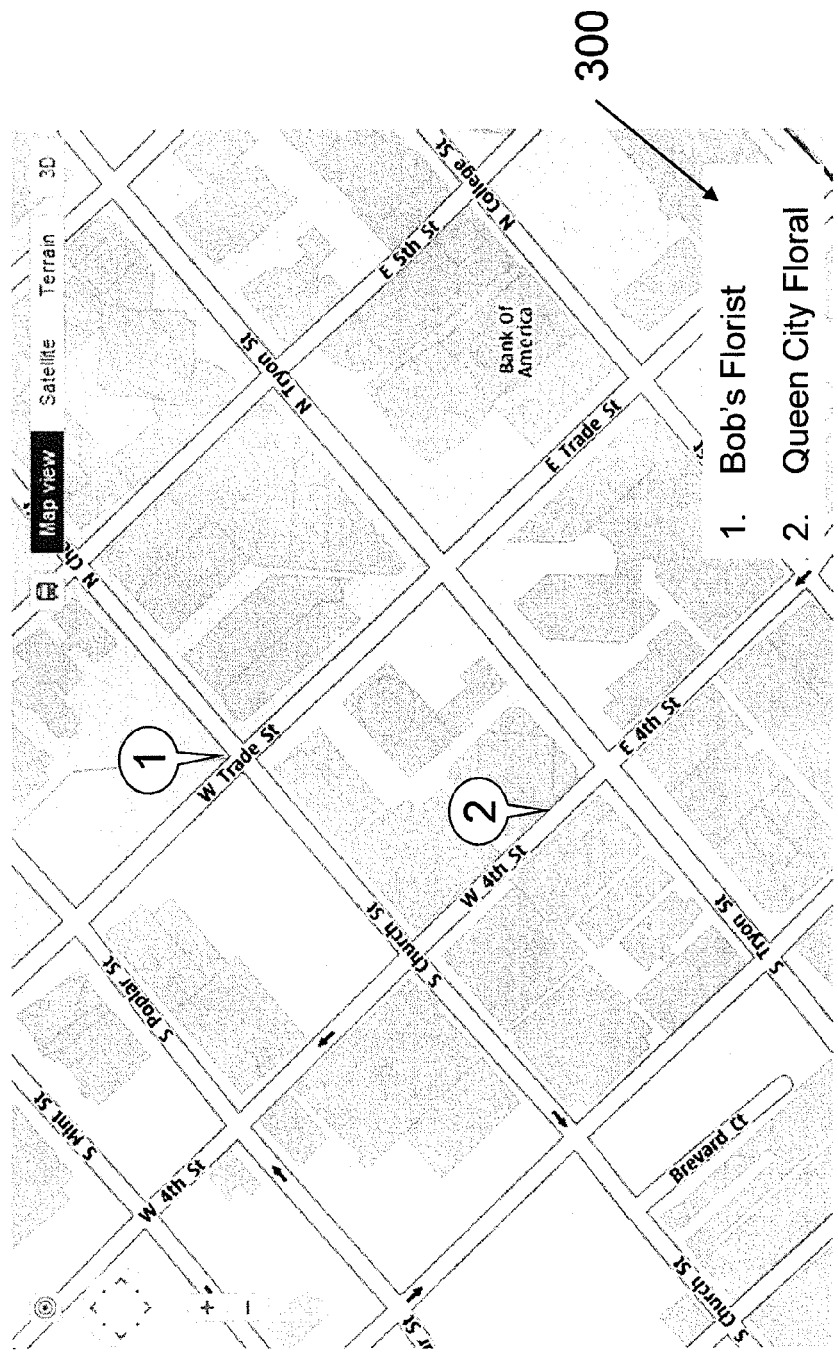
Figure 5:
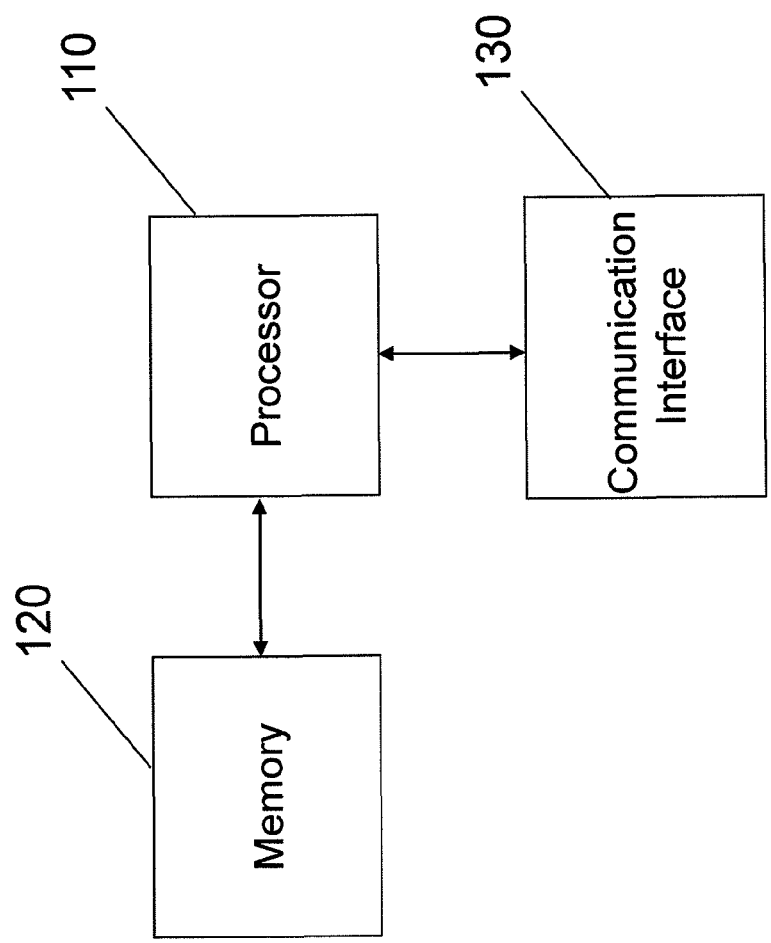
Figure 6:
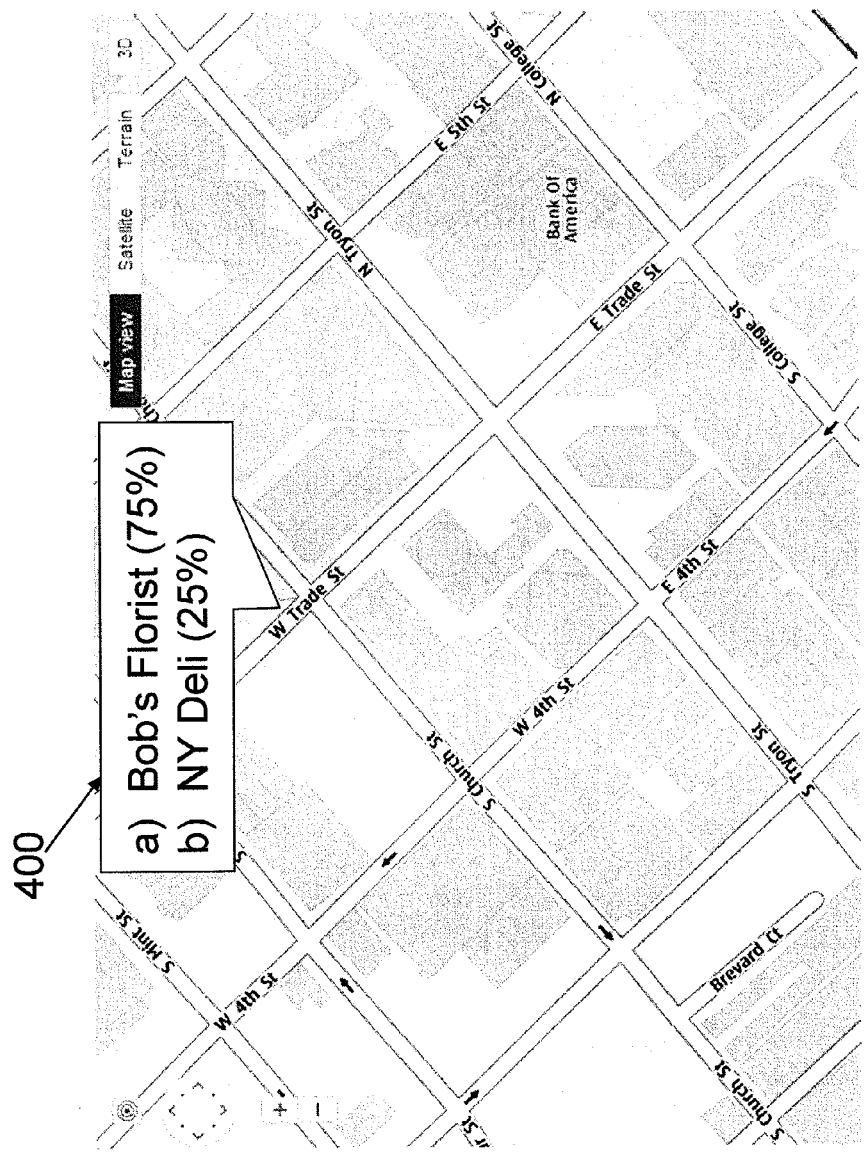
Figure 7:
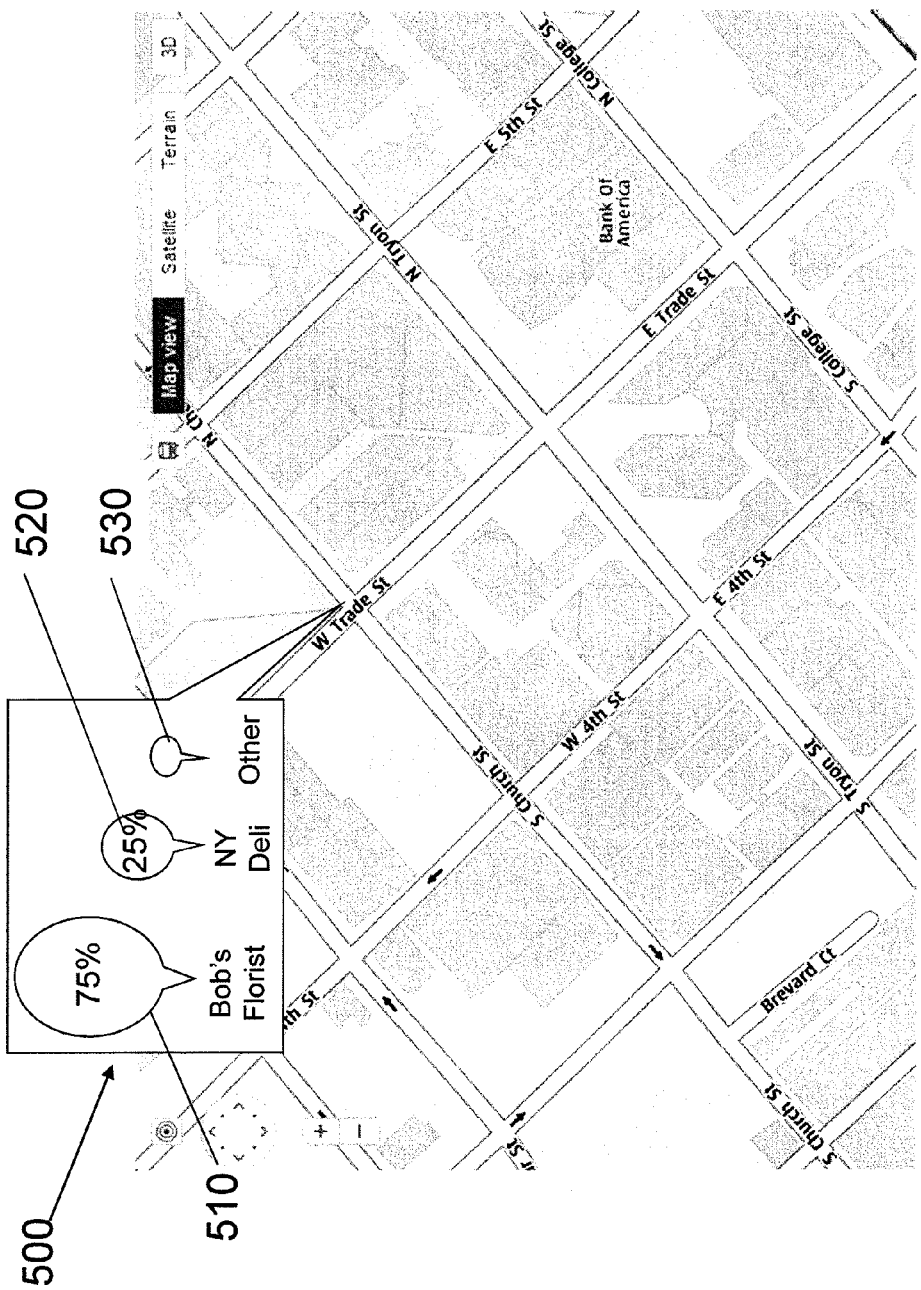
Figure 8:
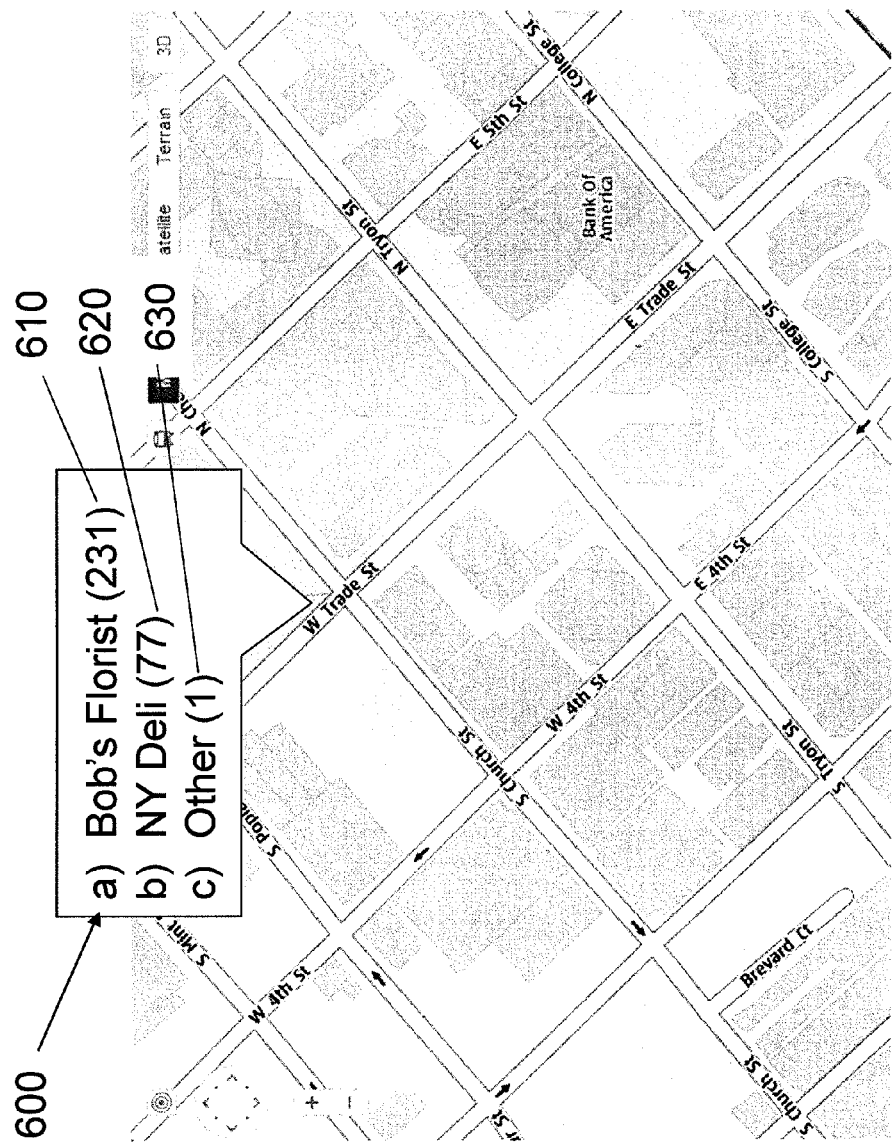
Figure 9:
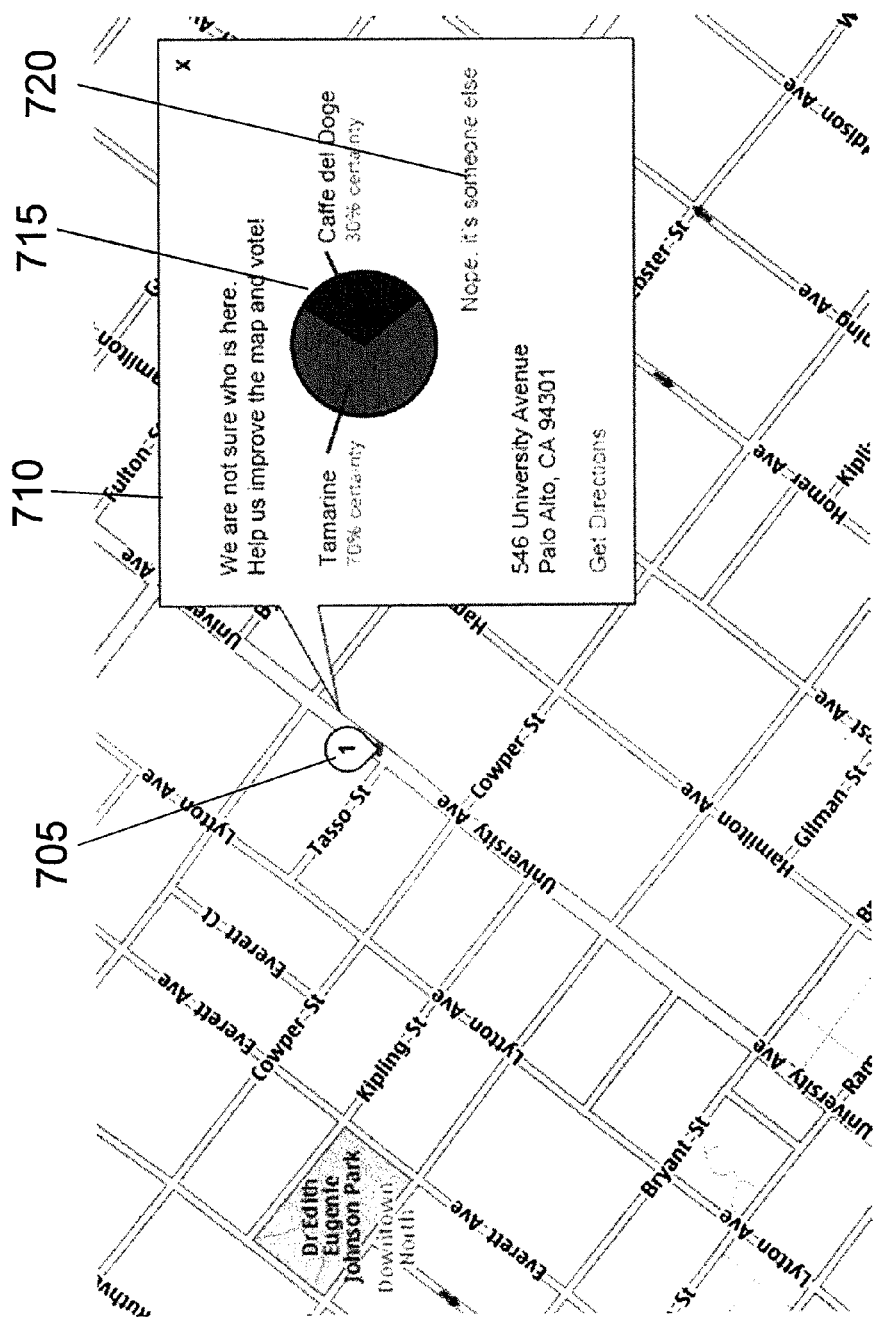
Figure 10:
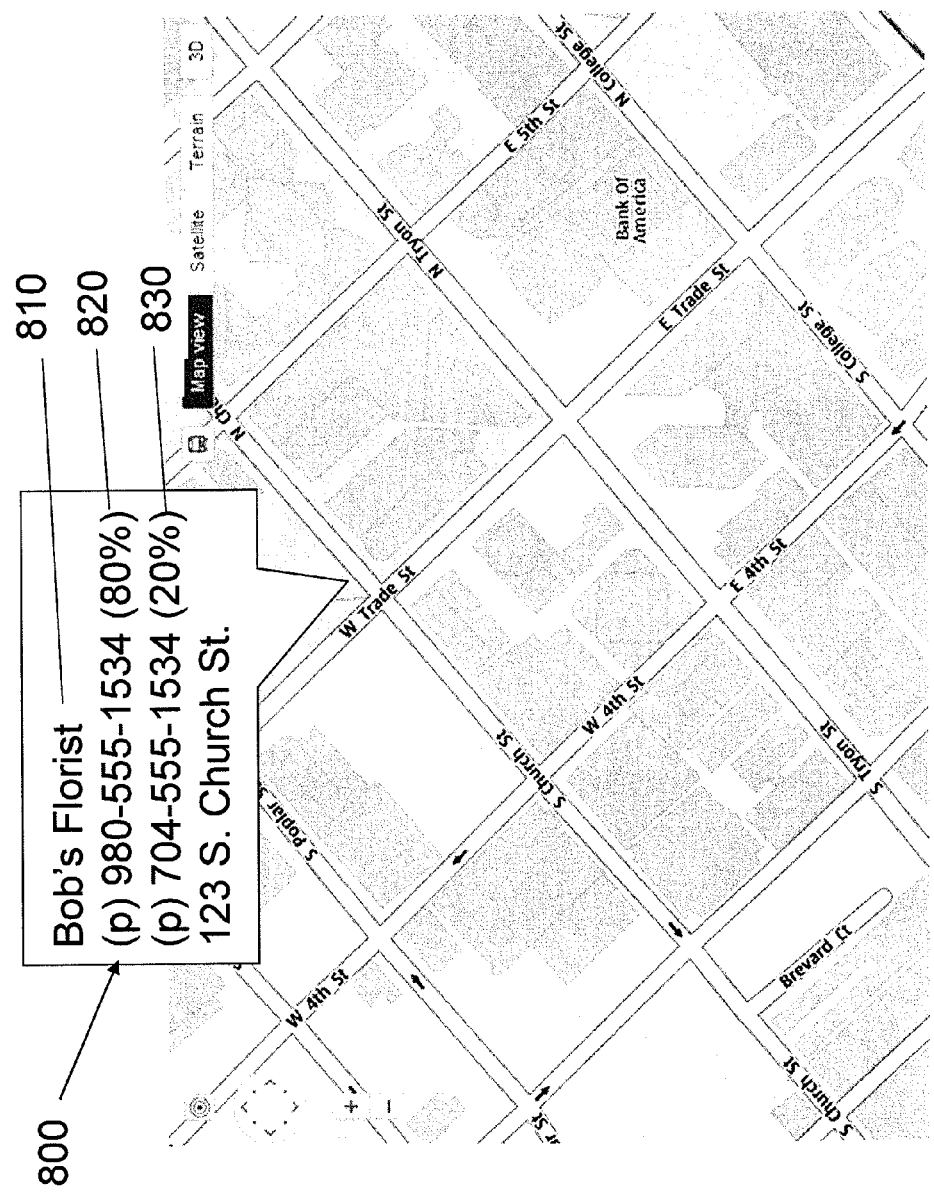
Figure 11:
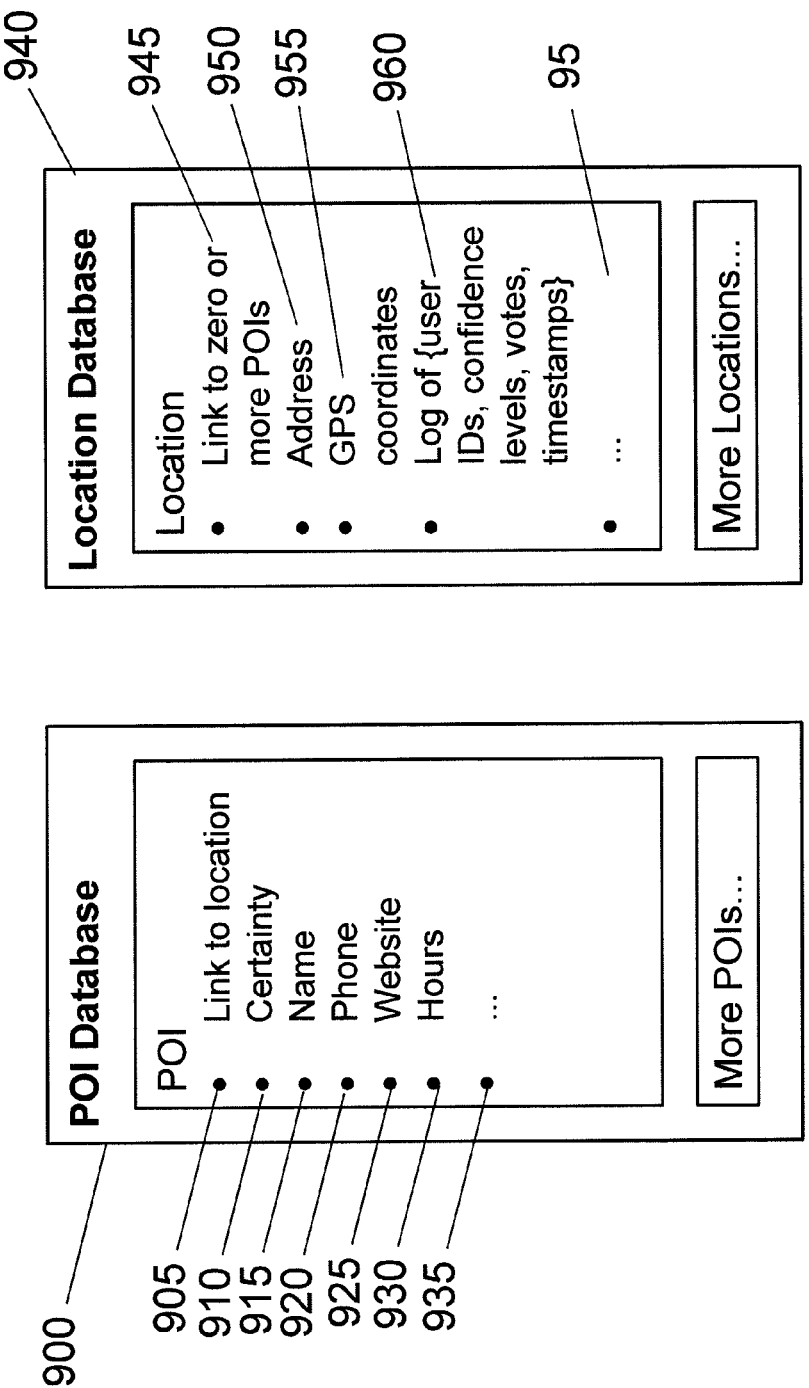
Figure 12:
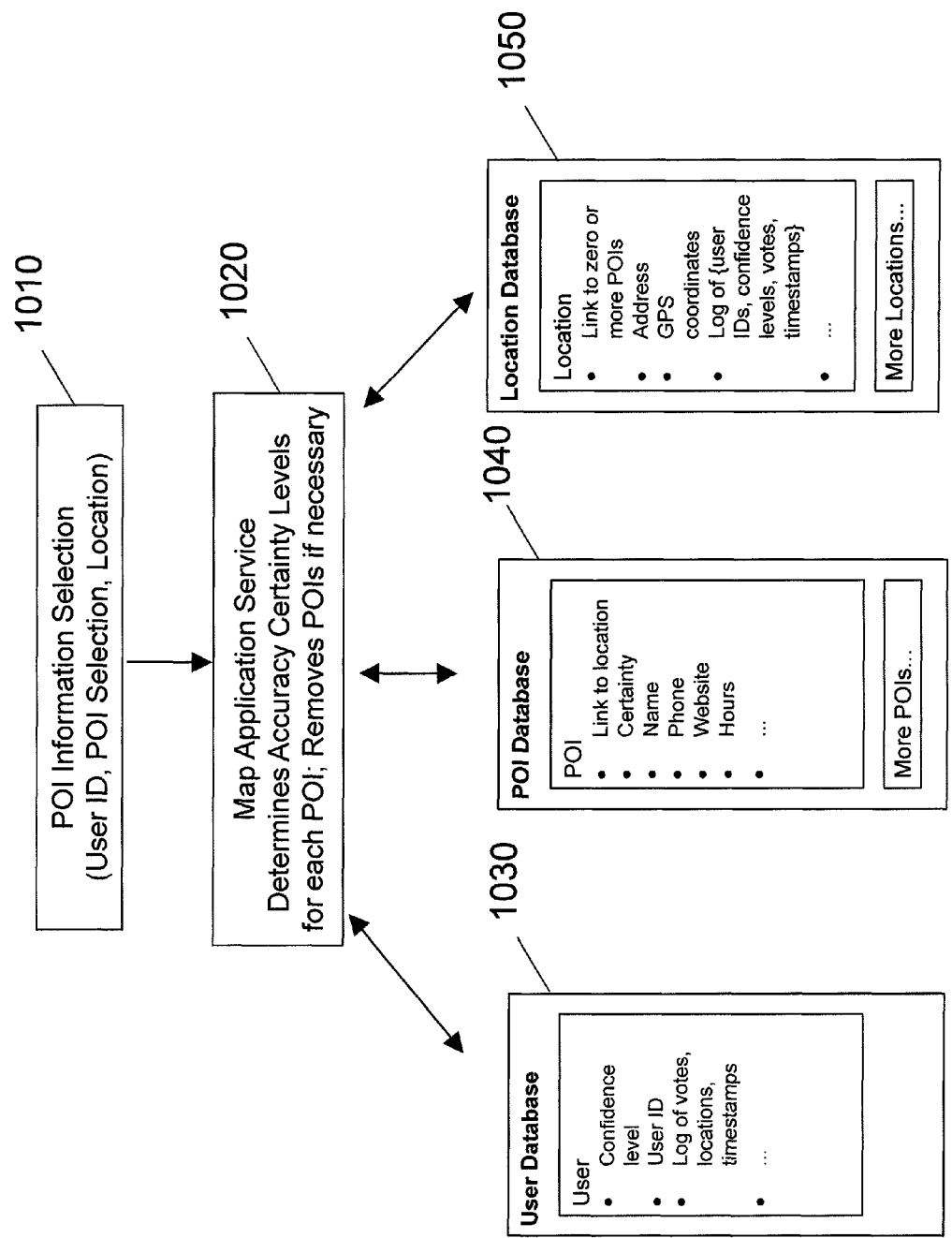
Figure 13:
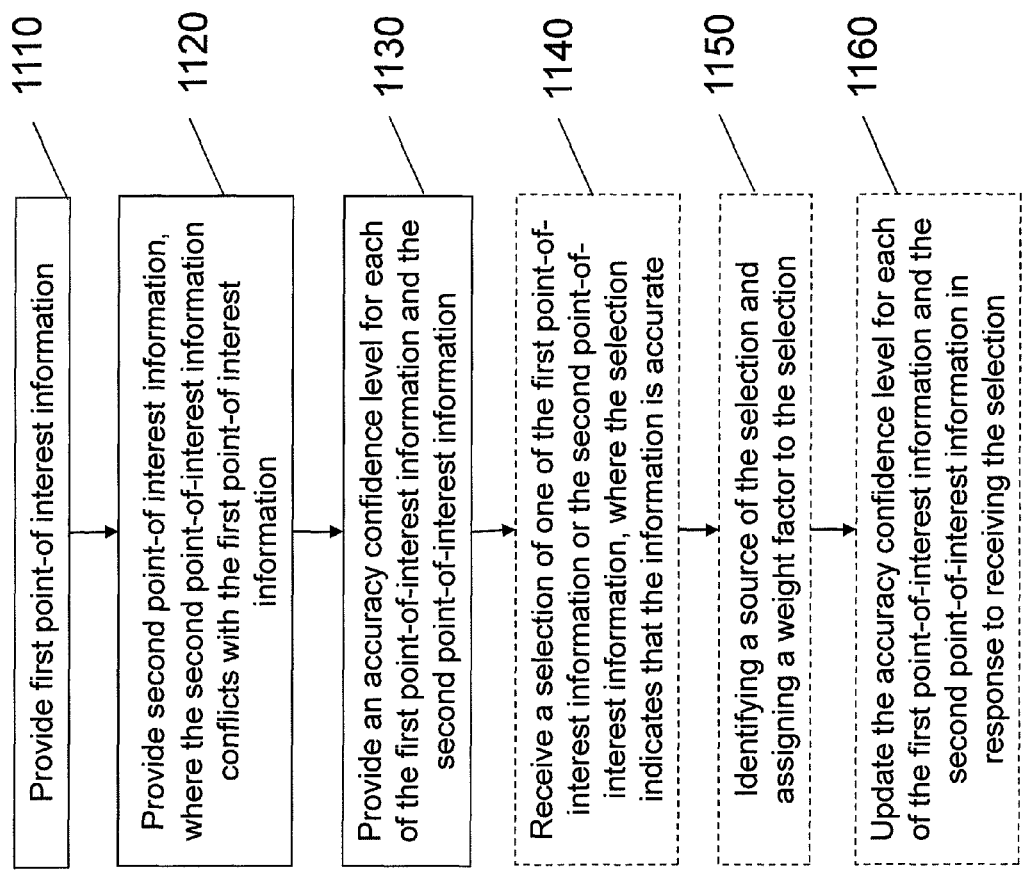

Having thus described example embodiments of the invention in general terms, reference will now be made to the accompanying drawings, which are not necessarily drawn to scale, and wherein:

FIG. 1 illustrates a communication system in accordance with an example embodiment of the present invention;

FIG. 2 is a schematic block diagram of a mobile device according to an example embodiment of the present invention;

FIG. 3 is a representation of a point-of-interest including point-of-interest information according to an example embodiment of the present invention;

FIG. 4 illustrates a map view of an area including points-of-interest according to example embodiments of the present invention;

FIG. 5 is a block diagram of a network entity according to an example embodiment of the present invention;

FIG. 6 illustrates a map view of an area depicting conflicting point-of-interest information conflict according to an example embodiment of the present invention;

FIG. 7 illustrates a map view of an area depicting conflicting point-of-interest information according to another example embodiment of the present invention;

FIG. 8 illustrates a map view of an area depicting conflicting point-of-interest information according to another example embodiment of the present invention;

FIG. 9 illustrates a map view of a location with a point-of-interest information conflict and a request for a selection according to an embodiment of the present invention;

FIG. 10 illustrates a map view of an area depicting conflicting point-of-interest information according to an example embodiment of the present invention;

FIG. 11 depicts example embodiments of a point-of-interest database entry and a location database entry according to the present invention;

FIG. 12 depicts a block diagram of a system for presenting conflicting point-of-interest information on maps and using crowd-sourcing to assess the validity of the conflicting data according to an example embodiment of the present invention; and FIG. 13 illustrates a flow chart of a method for providing conflicting point-of-interest information according to an example embodiment of the present invention.

DETAILED DESCRIPTION

Some example embodiments of the present invention will now be described more fully hereinafter with reference to the accompanying drawings, in which some, but not all embodiments of the invention are shown. Indeed, various embodiments of the invention may be embodied in many different forms and should not be construed as limited to the example embodiments set forth herein; rather, these example embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Example embodiments of the present invention may include a network element, such as a server 15 of FIG. 1, for interacting with a plurality of communication terminals (e.g., communication terminals 10 and 20) via network 30 in order to receive POI information and information regarding the accuracy of the POI information when conflicting POI information exists. The network 30 as shown in FIG. 1 may include a collection of various different nodes, devices or functions that may be in communication with each other via corresponding wired and/or wireless interfaces or in ad-hoc networks such as those functioning over Bluetooth®. As such, FIG. 1 should be understood to be an example of a broad view of certain elements of a system that may incorporate example embodiments of the present invention and not an all inclusive or detailed view of the system or the network 30. Although not necessary, in some example embodiments, the network 30 may be capable of supporting communication in accordance with any one or more of a number of first-generation (1G), second-generation (2.G), 2.5G, third-generation (3G), 3.5G, 3.9G, fourth-generation (4G) mobile communication protocols and/or the like.

One or more communication terminals 10 and 20 may be in communication with each other via the network 30 and each may include an antenna or antennas for transmitting signals to and for receiving signals from a base site, which could be, for example a base station that is part of one or more cellular or mobile networks or an access point that may be coupled to a data network, such as a local area network (LAN), a metropolitan area network (MAN), and/or a wide area network (WAN), such as the Internet. In turn, other devices (e.g., personal computers, server computers 15 or the like) may be coupled to the communication terminals 10 and 20 via the network 30. By directly or indirectly connecting the communication terminals 10 and 20 and other devices, such as server 15, to the network 30, the communication terminals 10 and 20 may be enabled to communicate with the other devices, such as server 15, or each other, for example, according to numerous communication protocols including Hypertext Transfer Protocol (HTTP) and/or the like, to thereby carry out various communication or other functions of the communications terminals 10 and 20.

In example embodiments, either of the communications terminals may be mobile or fixed communication devices. Thus, for example, the communications terminal 10, could be, or be substituted by, any of personal computers (PCs), personal digital assistants (PDAs), wireless telephones, desktop computer, laptop computer, mobile computers, cameras, video recorders, audio/video players, positioning devices, game devices, television devices, radio devices, or various other devices or combinations thereof. Similarly, the network 30 may include one or more servers, such as server 15, to provide and receive information and data to and from the communications terminals 10 and 20.

Although the communications terminals 10 and 20 may be configured in various manners, one example of a communications terminal that could benefit from embodiments of the invention is a mobile terminal, such as depicted in the block diagram of FIG. 2. While several embodiments of the mobile terminal may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communication devices, may employ embodiments of the present invention. As described, the mobile terminal may include various means for performing one or more functions in accordance with embodiments of the present invention, including those more particularly shown and described herein. It should be understood, however, that a mobile terminal may include alternative means for performing one or more like functions, without departing from the spirit and scope of the present invention.

The mobile terminal (e.g., mobile terminal 13) may, in some embodiments, be a computing device configured to employ an example embodiment of the present invention. However, in some embodiments, the mobile terminal may be embodied as a chip or chipset. In other words, the mobile terminal may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The mobile terminal may therefore, in some cases, be configured to implement an embodiment of the present invention on a single chip or as a single "system on a chip." As such, in some cases, a chip or chipset may constitute means for performing one or more operations for providing the functionalities described herein.

The mobile terminal 13 illustrated in FIG. 2 may include an antenna 32 (or multiple antennas) in operable communication with a transmitter 34 and a receiver 36. The mobile terminal may further include a processor 40 that provides signals to and receives signals from the transmitter and receiver, respectively. The signals may include signaling information in accordance with the air interface standard of the applicable cellular system, and/or may also include data corresponding to user speech, received data and/or user generated data. In this regard, the mobile terminal may be capable of operating with one or more air interface standards, communication protocols, modulation types, and access types. By way of illustration, the mobile terminal may be capable of operating in accordance with any of a number of first, second, third and/or fourth-generation communication protocols or the like. For example, the mobile terminal may be capable of operating in accordance with second-generation (2G) wireless communication protocols IS-136, GSM and IS-95, or with third-generation (3G) wireless communication protocols, such as UMTS, CDMA2000, wideband CDMA (WCDMA) and time division-synchronous CDMA (TD-SCDMA), with 3.9G wireless communication protocols such as E-UTRAN (evolved-UMTS terrestrial radio access network), with fourth-generation (4G) wireless communication protocols or the like.

It is understood that the apparatus may include circuitry implementing, among others, audio and logic functions of the mobile terminal 13. The processor may be embodied in a number of different ways. For example, the processor may be embodied as various processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like), a hardware accelerator, and/or the like.

In an example embodiment, the processor 40 may be configured to execute instructions stored in the memory device 60 or otherwise accessible to the processor 40. Alternatively or additionally, the processor 40 may be configured to execute hard coded functionality. As such, whether configured by hardware or software methods, or by a combination thereof, the processor 40 may represent an entity (e.g., physically embodied in circuitry) capable of performing operations according to an embodiment of the present invention while configured accordingly. Thus, for example, when the processor 40 is embodied as an ASIC, FPGA or the like, the processor 40 may be specifically configured hardware for conducting the operations described herein. Alternatively, as another example, when the processor 40 is embodied as an executor of software instructions, the instructions may specifically configure the processor 40 to perform the algorithms and/or operations described herein when the instructions are executed. However, in some cases, the processor 40 may be a processor of a specific device (e.g., a mobile terminal or network device) adapted for employing an embodiment of the present invention by further configuration of the processor 40 by instructions for performing the algorithms and/or operations described herein. The processor 40 may include, among other things, a clock, an arithmetic logic unit (ALU) and logic gates configured to support operation of the processor 40.

The mobile terminal 13 may also comprise a user interface including an output device such as an earphone or speaker 44, a ringer 42, a microphone 46, a display 48, and a user input interface, which may be coupled to the processor 40. The user input interface, which allows the mobile terminal to receive data, may include any of a number of devices allowing the mobile terminal to receive data, such as a keypad 50, a touch sensitive display (not shown) or other input device. In embodiments including the keypad, the keypad may include numeric (0-9) and related keys (#, *), and other hard and soft keys used for operating the mobile terminal 13. Alternatively, the keypad may include a conventional QWERTY keypad arrangement. The keypad may also include various soft keys with associated functions. In addition, or alternatively, the mobile terminal may include an interface device such as a joystick or other user input interface. The mobile terminal may further include a battery 54, such as a vibrating battery pack, for powering various circuits that are used to operate the mobile terminal, as well as optionally providing mechanical vibration as a detectable output. The mobile terminal 13 may also include a sensor 49, such as an accelerometer, motion sensor/detector, temperature sensor, or other environmental sensor to provide input to the processor indicative of a condition or stimulus of the mobile terminal 13.

The mobile terminal 13 may further include a user identity module (UIM) 58, which may generically be referred to as a smart card. The UIM may be a memory device having a processor built in. The UIM may include, for example, a subscriber identity module (SIM), a universal integrated circuit card (UICC), a universal subscriber identity module (USIM), a removable user identity module (R-UIM), or any other smart card. The UIM may store information elements related to a mobile subscriber. In addition to the UIM, the mobile terminal may be equipped with memory. For example, the mobile terminal may include volatile memory 60, such as volatile Random Access Memory (RAM) including a cache area for the temporary storage of data. The mobile terminal may also include other non-volatile memory 62, which may be embedded and/or may be removable. The non-volatile memory may additionally or alternatively comprise an electrically erasable programmable read only memory (EEPROM), flash memory or the like. The memories may store any of a number of pieces of information, and data, used by the mobile terminal to implement the functions of the mobile terminal. For example, the memories may include an identifier, such as an international mobile equipment identification (IMEI) code, capable of uniquely identifying the mobile terminal. Furthermore, the memories may store instructions for determining cell id information. Specifically, the memories may store an application program for execution by the processor 40, which determines an identity of the current cell, i.e., cell id identity or cell id information, with which the mobile terminal is in communication.

In general, example embodiments of the present invention provide a method, apparatus and computer program product for providing first POI information and second POI information which conflicts with the first POI information, and providing an accuracy confidence level of each of the first POI information and the second POI information. Embodiments may further solicit feedback (e.g., a selection) from a user regarding the user's determination of which of the first POI information and the second POI information is accurate.

Map and navigation services available via the internet, mobile device network services, on-device programs, or the like can provide a plethora of information to a user of a communications terminal (e.g., communication terminal 10) regarding location, directions, and destination information. Map service providers may provide POI information that may correspond to a particular location. POI information may generally include any information that a person may find of use or of interest. POI information is associated with a location and may include landmarks, businesses, schools, restaurants, monuments, or any number of items that may interest a person. While some POI information may remain relatively unchanged over time (for example, a monument at a location), other POI information may be more volatile and change over time (for example, businesses or information regarding a business).

FIG. 3 is an illustration of an example embodiment of POI information. The POI information includes an address 200 defining the location of the POI. The POI information may also include a name 205 (e.g., a business name), a category 210 for the POI, such as a business type, hours of operation 215, if applicable, and a phone number 220, if applicable. Other POI information may also be available, such as a menu, reviews, or the like. Further, while the illustrated embodiment depicts a business which is the POI, the POI may be any number of things such as a geological formation (e.g., the Grand Canyon), a historic marker (e.g., an historic battlefield), or any location with information that may be of interest. As such, each POI includes POI information related to that POI.

An example embodiment where POI information may be useful may be when a person is searching for a business as illustrated in FIG. 4. A person may search within a map service for a florist within a certain area. The map service provider may search a database of existing POIs for POI information corresponding to a business type of florist. The search may also include a location criterion, such as closest to a location specified by a user or located within a particular town, city, or area. The map service provider may sort the available POIs using the POI information for each POI for those with a location and business type corresponding to a user's search criteria. The map may present to the user one or more potential florists in the desired area for the user to select from. In the illustrated embodiment, marker 1 and marker 2 depict the locations of two florists. Each of these markers, 1 and 2, correspond to a POI. In the illustrated embodiment, marker 1 corresponds to "Bob's Florist" while marker 2 corresponds to "Queen City Floral" as indicated with text box 300.

As it is not practical for the providers of map services to physically travel all available routes to determine or verify the information associated with every POI, map services often rely upon POI information entered by an individual or by a proprietor of the POI. That POI information may or may not be properly screened by the map services provider for accuracy such that a user of the map service may find that the POI information for a given location is inaccurate upon arrival. Repeated inaccuracies in POI information discovered by a user may lead to lower confidence in the map service with the user potentially discontinuing use of the map service. It may therefore be desirable to disclose to a user an accuracy confidence level of POI information, particularly when there exists conflicting POI information associated with a location.

A map service provider may receive first POI information for a given location on a map from a user. While the map service may be hosted by a communications terminal, such as communications terminal 10 or 20, the map service of one embodiment is hosted by a network entity, such as server 15 that is in communication with the communications terminal(s). Although the network entity, such as server 15, may be configured in various manners, the network entity of one embodiment is shown in FIG. 5. The apparatus of FIG. 5 includes various means, such as a processor 110, memory 120, and communication interface 130, for performing various functions described herein. These means of the apparatus as described may be embodied as, for example, hardware elements (e.g., a suitably programmed processor, combinational logic circuit, and/or the like), a computer program product comprising computer-readable program instructions (e.g., software or firmware) stored on a computer-readable medium (e.g. memory) that is executable by a suitably configured processing device (e.g., the processor), or some combination thereof.

The processor 110 may, for example, be embodied as various means including one or more microprocessors with accompanying digital signal processor(s), one or more processor(s) without an accompanying digital signal processor, one or more coprocessors, one or more controllers, processing circuitry, one or more computers, various other processing elements including integrated circuits such as, for example, an ASIC (application specific integrated circuit) or FPGA (field programmable gate array), or some combination thereof Accordingly, although illustrated in FIG. 5 as a single processor, in some embodiments the processor comprises a plurality of processors. In an example embodiment, the processor is configured to execute instructions stored in the memory 120 or otherwise accessible to the processor. These instructions, when executed by the processor, may cause the apparatus to perform one or more of the functionalities of the mobile terminal or the network entity as described herein. As such, whether configured by hardware or software methods, or by a combination thereof, the processor may represent an entity configured to perform operations according to embodiments of the present invention when configured accordingly. Thus, for example, when the processor is embodied as an ASIC, FPGA or the like, the processor may comprise specifically configured hardware for conducting one or more operations described herein. Alternatively, as another example, when the processor is embodied as an executor of instructions, the instructions may specifically configure the processor to perform one or more algorithms and operations described herein.

The memory 120 may include, for example, non-transitory volatile and/or non-volatile memory. Although illustrated in FIG. 5 as a single memory, the memory may comprise a plurality of memories. The memory may comprise volatile memory, non-volatile memory, or some combination thereof In this regard, the memory may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. The memory may be configured to store information, data, applications, instructions, or the like for enabling the mobile terminal to carry out various functions in accordance with some example embodiments of the present invention. For example, in at least some embodiments, the memory is configured to buffer input data for processing by the processor 110. Additionally or alternatively, in at least some embodiments, the memory is configured to store program instructions for execution by the processor. The memory may store information in the form of static and/or dynamic information.

The communication interface 130 may be embodied as any device or means embodied in hardware, a computer program product comprising computer readable program instructions stored on a computer readable medium (e.g., the memory 120) and executed by a processing device (e.g., the processor 110), or a combination thereof that is configured to receive and/or transmit data from/to a remote device over the network 30. In this regard, the communication interface may be configured to transmit and receive data over a PLMN network (e.g., a cellular network implementing UTRAN and/or E-UTRAN standards) operated by a network operator. In at least one embodiment, the communication interface is at least partially embodied as or otherwise controlled by the processor. In this regard, the communication interface may be in communication with the processor, such as via a bus. The communication interface may include, for example, an antenna, a transmitter, a receiver, a transceiver and/or supporting hardware or software for enabling communications with other entities of the system. The communication interface may be configured to receive and/or transmit data using any protocol that may be used for communications between computing devices of the system. The communication interface may additionally be in communication with the memory and/or user interface, such as via a bus.

As noted above, the map service provider may receive first POI information associated with a given location from a user. The map service may then assign that POI information to the location. The map service may then receive second POI information associated with the same location on the map from another user. In this example, the second POI information conflicts with the first information, such as by the first POI information identifying the location as a first business while the second POI information identifies the location as a second business, different from the first. The map service may then select which of the first and second POI information is believed to be or is otherwise most likely to be accurate (e.g., the most recent or the most detailed) so as to associate only the POI information believed to be accurate with the location. Alternatively, the map service may assign both the first and second POI information to the single location, such as in an instance in which it is unclear as to which of the first and second POI information is more likely to be accurate. This methodology for selecting, or not selecting, what is believed to be the accurate POI information may lead to POI information inaccuracies and confusion for users trying to locate a business or a particular POI. It may therefore be desirable to use crowd-sourcing to determine accuracy of POI information for a given location.

Crowd-sourcing relates to outsourcing tasks to a group of people willing to participate in generating feedback or performing the outsourced tasks. In at least one embodiment, crowd-sourcing can be used to help determine the accuracy of POI information. For example, a map service, such as implemented by server 15, may have received conflicting POI information associated with a given location. FIG. 6 depicts a map provided by a map service wherein for the location marked by marker 400, there have been two distinct business names identified as information related to the POI such that there is conflicting POI information. A user of the map service may be presented with a marker 400 that indicates that this physical location has been identified by other users or map service administrators as a business with the name of Bob's Florist and NY Deli. Further, the map service may provide an accuracy confidence level of each of the conflicting POI information available in accordance with an example embodiment. The POI information corresponding to Bob's Florist is indicated as having a 75% accuracy confidence level while the POI information corresponding to NY Deli is indicated as having a 25% accuracy confidence level. Such accuracy confidence levels may alert a user, who is not at the physical location, of the likelihood of the actual POI present at the physical location.

In addition to providing conflicting POI information, the apparatus may include a processor configured to solicit input, such as a selection from a user of a communications terminal 10 or 20, as to which of the conflicting POI information is accurate, if any. In this regard, the user viewing the conflicting POI information may enter a selection of the POI information believed or known to be accurate by that user. For example, if the user is familiar with the area and recalls seeing "Bob's Florist" in that area or location, the user may select "Bob's Florist" by providing an indication of their selection (e.g., via touch screen, mouse/cursor, keypad, voice command, etc.). The user's input may then be received by the map service, such as by the processor, the communications interface or the like, which in turn, factors the selected POI information from the user into a calculation of the accuracy confidence levels of the conflicting POI information. The user is then part of the crowd from which the crowd-sourced information is received.

While FIG. 6 illustrates representations of conflicting POI information on a map with text and a numerical indication of a percentage confidence level of the accuracy, other methods of communicating the accuracy confidence level may also be implemented. For example, FIG. 7 illustrates a location marker 500 with conflicting POI information. The illustrated embodiment of FIG. 7 depicts the conflicting POI information with an image of markers 510, 520, and 530, each with a size corresponding to their respective accuracy confidence level. The marker 510 for Bob's Florist is the largest as it has been indicated to be the POI information with the highest accuracy confidence level. Further, the numerical depiction of the accuracy confidence level may also be included for clarity. The accuracy confidence level marker 520 of NY Deli is considerably smaller than that of Bob's Florist indicating that there is a lower likelihood that the NY Deli POI information is accurate. Again, a user may select the POI information they believe is accurate to add their input to the accuracy confidence level determination. In the depicted embodiment of FIG. 7, a third option is available which indicates "other" at 530. The "other" POI selection is available for a user to select when none of the other conflicting POI information is determined or believed to be accurate. A selection of the "other" option may cause the accuracy confidence level of the POI information of "other" to increase while the accuracy confidence levels of the remaining POI information options correspondingly decreases. Optionally, the selection of "other" may prompt a user to enter information corresponding to the POI and send the new POI information to the map service for possible inclusion as new POI information conflicting with the existing POI information.

FIG. 8 illustrates a further example of a manner in which conflicting POI information may be represented. The location marker 600 of FIG. 8 shows a selection-count (e.g., the number of times an option has been selected) that each of the conflicting POI information options has received for that location. In the instant embodiment, "Bob's Florist" has a selection-count of 231 compared to 77 for "NY Deli," and one for "Other." The selection-count may indicate to a user that there is a high likelihood that the POI information corresponding to "Bob's Florist" is the accurate POI information. The selection-count may be representative of the accuracy confidence level as a user may easily interpret the selection-count as a percentage of the total number of selections.

FIG. 9 illustrates another embodiment of another manner in which conflicting POI information may be presented to a user. In the illustrated embodiment, a location on a map is depicted at 705. Information window 710 presents POI information associated with the location 705 and requests user input to determine which POI information is accurate. The information window 710 illustrates the conflicting POI information through a pie chart 715 which depicts the accuracy confidence level for each of the two entries of POI information that have been associated with this location. A user may then select the POI information believed to be accurate or the "other" option 720 to contribute to the accuracy confidence level for the POI information available.

While the above embodiments describe various ways of presenting conflicting POI information with an accuracy confidence level, there are many additional methods to express the information. For example, through varying formats such as size, color, opacity, hue, saturation, or proportion of the conflicting POI information, the accuracy confidence levels may be distinguished. Further, rather than markers and pie charts as illustrated in FIGS. 8 and 9, respectively, bar graphs, scales, 3D perspective, or other proportional formats may be used to present different accuracy confidence levels. In general, POI information that has a higher accuracy confidence level will be shown with greater visual weight and/or given more prominence (e.g., with color, opacity, size, etc.) than POI information with lower accuracy confidence levels. Further, the format for depicting conflicting POI information may be user selectable based upon a user's preference.

Once a particular POI information option has reached an accuracy confidence level above a pre-defined threshold, the map service provider may determine that the POI information is accurate such that the conflicting POI information is discarded and/or no longer presented to a user of the map service. Further, if the accuracy confidence level of a POI information option falls below a second pre-defined threshold, that POI information may be discarded and/or no longer displayed as an option for selection.

While crowd-sourcing information is a cost-effective method for receiving information regarding POI information on a map, crowd-sourced information may not always be accurate. For example, a user may firmly believe that a first POI information option is accurate when, in fact, it is not. In this instance, the user may unintentionally indicate to a map service the inaccurate POI information. Crowd-sourced information may also come from individuals or groups who are promoting one business over another, for example when they are affiliated with or prefer a competitive business. In this regard, a user may prefer a particular pizza restaurant such that they provide false POI information for the location of a competitor to their preferred pizza restaurant. Similarly, if a person has a bad experience or grudge against a particular establishment, they may provide knowingly false POI information in an attempt to reduce traffic flow to the establishment. To avoid collusion where a group of individuals conspires to provide false POI information, the map service provider may not rely entirely on crowd-sourced information.

In an effort to mitigate the impact of false POI information on the accuracy confidence level of POI information, the apparatus may use methods to assess the accuracy of the source of the POI information provided to the map service. The map service may use a formula to calculate the likely accuracy of each entry of crowd-sourced information. The formula may include various factors that may be used independently or together to establish a weight factor to be associated with each instance of crowd-sourced information. The weight factor of the crowd-sourced information may then be used to determine the impact of the crowd-sourced information on the accuracy confidence level.

One factor that may be used by the processor to determine the weight factor of an instance of crowd-sourced information may be a reliability rating of the source providing the crowd-sourced information. The source of the crowd-sourced information may be a user of the map service. The reliability rating may be calculated by the processor based upon the frequency with which the user provides crowd-sourced information that is later determined to be accurate. For example, if a user has previously selected a particular entry of POI information over another entry of POI information, and the accuracy confidence level of the selected POI information later exceeds the threshold to be held as accurate, then the user's reliability rating may increase as they provided accurate POI information. Similarly, if a user provides information regarding a selection of POI information that is later determined to be inaccurate, the user's reliability rating may decrease accordingly.

Another factor that may be used by the processor for determining the weight factor of a selection of POI information from crowd-sourcing may be the location of the source or user. For example, map services may be used on mobile devices which may be used for navigation purposes. Thus, if a user provides a selection of POI information related to a given location, and the user is determined to be at the given location (e.g., through global positioning recognition of the device), the selection may be given a higher weight factor by the processor than the selection of POI information by a user who is not located proximate the given location. Since a user who is at or can see a location is more likely to be accurate with regard to POI information related to that location, their selection of POI information from among the conflicting POI information may be given a higher weight factor by the processor.

Still another factor that may be used by the processor for determining the weight factor of a selection of POI information may be the time period in which the POI information selection is received by the map service, such as by the processor or the communications interface. For example, a selection of POI information from six months ago may be afforded a lower weight factor by the processor than a selection of POI information from a week ago. Thus, as time passes, even if no additional crowd-sourced information is available, the more recent selection of POI information may cause the processor to increase the accuracy confidence level of the more recently selected POI information.

Other information regarding an individual user may contribute to the weight factor that is afforded by the processor to their selection of POI information. For example, if the user is an employee or service provider of the map service, their selection of POI information may have a higher weight factor than the selection of POI information from a user of unknown employment. If a user is a resident of a particular city or town, their selection of POI information related to POIs within that city or town may be weighted more heavily than the selection of POI information by a visitor. Residency status may be obtained by the processor from a user's service provider or from a geographic location history of the user (e.g., frequent check-ins at local venues or location history of their mobile device). In one embodiment, the selection of POI information from a user may be discarded (e.g., a weight factor of zero) if the selection is made from outside the country of the POI.

In some embodiments, the conflicting POI information may be more granular information pertaining to details of a POI. For example, FIG. 10 illustrates an example embodiment in which the POI located at 123 S. Church St. has been determined to be "Bob's Florist" 810. However, the POI information including the phone number of "Bob's Florist" is not definitively known. As such, two phone numbers are shown 820 and 830, each with an accuracy confidence level. The determination of the accuracy confidence level may be performed by the processor in the same manner as outlined above with respect to more general POI information. Any level of POI information may be subject to challenge with conflicting POI information such that a similar manner of resolution through crowd-sourcing of information may be used.

An example embodiment of the present invention may be initiated by a user selecting a location on a map on a device, such as a mobile device. The map service implemented by the processor may then make a request to a location database, which may link to one or more entries of POI information in a POI database associated with the chosen location. In one embodiment, the location database and the POI database may be stored within the memory. However, the location database and the POI database may be stored in separate memory devices and/or may be remote from the processor so long as the location database and the POI database are accessible by the processor. The apparatus, such as the processor, the communications interface or the like, may then provide conflicting POI information and an accuracy confidence level for each entry of the conflicting POI information for display by a communications terminal (e.g., communications terminal 10 or 20). As illustrated in FIG. 11, the POI database may include the POIs for a city, region, or all POIs available through a map service. Each POI in the database may include POI information such as a link to the location 905, the certainty that the POI is accurate for the location 910 and optionally the name of the POI 915, a phone number for the POI 920, a website for the POI 925, hours of operation of the POI 930, and any other information which may be relevant to the POI 935, which may include user reviews, menus, services offered, etc. The location database 940 may include, for each location in the database, a link to zero or more POIs 945, each associated with related POI information, optionally the address of the location 950, the GPS coordinates of the location 955, a log of crowd-sourced information collected for this location regarding the POI information 960, and any other information pertinent to the physical location. Thus, each POI may have a link to, or otherwise be associated with a distinct location. It may also be a goal that each location with a corresponding POI does not have conflicting POI information. Although conflicting POI information may present challenges for this goal, through the crowd-sourcing of POI information, the method, apparatus and computer program product of example embodiments permit the POI information for a location to be accurately maintained and to change as needed as the POI changes.

FIG. 12 illustrates a high level diagram of the process for selection of POI information believed to be accurate. When a user is presented with conflicting POI information, the user may select the POI information believed to be accurate. The POI information selection 1010 may include a source, such as a User ID, a POI information selection, and a location of the user. The selection may be sent to the map service 1020 which, in one embodiment, is embodied by the processor and which calculates the weight factor afforded the selection of POI information based on the source, such as a user which may be identified by the User ID. The map service 1020 may reference a User Database 1030, such as provided by the memory, to aid in the determination of the weight factor afforded the POI information selection from the User ID by ascertaining one or more of a confidence level (e.g., reliability), location history (e.g., local resident or visitor), user role (e.g., employee of the map service), etc. The map service 1020 may then calculate a weight factor of the selection using the location of the user (e.g., are they close to the POI) and the information from the User Database 1030. If the weight factor of the selection is determined to be zero (e.g., highly unreliable), the POI information selection may be discarded at any point. Once the weight factor of the selection is known, the POI database, which may also be provided by the memory, may be updated according to the accuracy certainty level of the POI information that was determined by the map service. Similarly, the location in the location database may be updated with the revised accuracy confidence level for each entry of POI information associated with the location. The User Database, which may also be provided by the memory, may be updated with the POI information selection for purposes of future reliability ratings. In some embodiments, the accuracy confidence level for each POI is updated by the processor using Bayesian inferencing.

FIG. 13 is a flowchart illustrative of a system, method and program product according to example embodiments of the invention. The flowchart operations may be performed by an apparatus, such as shown in FIG. 5, which may be embodied by a server 15 or other network entity or as a communications terminal, such as a mobile terminal 13 as shown in FIG. 2. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody means for implementing the functions specified in the flowchart block(s). These computer program instructions may also be stored in a computer-readable memory that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s).

Accordingly, blocks of the flowchart support combinations of means for performing the specified functions, combinations of operations for performing the specified functions and program instruction means for performing the specified functions. It will also be understood that one or more blocks of the flowchart, and combinations of blocks in the flowcharts, can be implemented by special purpose hardware-based computer systems which perform the specified functions, or combinations of special purpose hardware and computer instructions.

An example embodiment of a method of the present invention for providing first POI information and second POI information which conflicts with the first POI information and providing an accuracy confidence level of each of the first POI information and the second POI information is depicted in the flowchart of FIG. 13. First point-of-interest information may be provided at 1110. Second point-of-interest information, where the second point-of-interest information conflicts with the first information, may be provided at 1120. An accuracy confidence level for each of the first point-of-interest information and the second point-of-interest information may be provided at 1130. The method may optionally or additionally include receiving a selection of one of the first point-of-interest information or the second point-of-interest information, where the selection is an indication that the information is accurate at 1140. Optionally or additionally, the method may identify a source of the selection and assign a weight factor to the selection at 1150. Optionally or additionally, the method may update the accuracy confidence level for each of the first point-of-interest information and the second point-of-interest information in response to receiving the selection at 1160.

In an example embodiment, an apparatus for performing the method of FIG. 13 above is depicted in FIG. 5 and may comprise a processor (e.g., the processor 110) configured to perform some or each of the operations (1110-1160) described above. The processor may, for example, be configured to perform the operations (1110-1160) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 1110-1160 may comprise, for example, the processor 110 and/or a device or circuit for executing instructions or executing an algorithm for processing information as described above.

As described above and as will be appreciated by one skilled in the art, embodiments of the present invention may be configured as a system, method or electronic device. Accordingly, embodiments of the present invention may be comprised of various means including entirely of hardware or any combination of software and hardware. Furthermore, embodiments of the present invention may take the form of a computer program product on a computer-readable storage medium having computer-readable program instructions (e.g., computer software) embodied in the storage medium. Any suitable computer-readable storage medium may be utilized including hard disks, CD-ROMs, optical storage devices, or magnetic storage devices.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method comprising:
providing first point-of-interest information associated with a location;
providing to a processor second point-of-interest information associated with the location, wherein the first point-of-interest information and the second point-of-interest information are mutually exclusive;
providing an accuracy confidence level for each of the first point-of-interest information and the second point-of-interest information;
receiving a selection of one of the first point-of-interest information or the second point-of-interest information, wherein the selection indicates that the selected one of the first point-of-interest information or the second point-of-interest information is accurate; and
updating the accuracy confidence level for each of the first point-of-interest information and the second point-of-interest information in response to receiving the selection.

2. The method according to claim 1, further comprising directing presentation of the first point-of-interest information and directing to cease presentation of the second point-of-interest information in response to the accuracy confidence level of the first point-of-interest information exceeding a threshold value in response to receiving a selection of the first point-of-interest information.

3. The method of claim 1, further comprising identifying a source of the selection and assigning a weight factor to the selection in response to identifying the source of the selection.

4. The method according to claim 3, further comprising updating the accuracy confidence level for each of the first point-of-interest information and the second point-of-interest information in response to receiving the selection, based at least in part on the weight factor of the selection.

5. The method according to claim 1, wherein the accuracy confidence level of each of the first and second point-of-interest information is represented by a format chosen from the group consisting of at least one of a percentage, a pie-chart, a bar chart, a selection-count, a transparency level, a size, a level of prominence, or a color.

6. An apparatus comprising at least one processor and at least one memory including computer program code, the at least one memory and the computer program code configured to, with the at least one processor, cause the apparatus to at least perform:
provide first point-of-interest information associated with a location;
provide second point-of-interest information associated with the location, wherein the first point-of-interest and the second point-of-interest information are mutually exclusive;
provide an accuracy confidence level for each of the first point-of-interest information and the second point-of-interest information
receive a selection of one of the first point-of-interest information or the second point-of-interest information, wherein the selection indicates that the selected one of the first point-of-interest information or the second point-of-interest information is accurate; and
update the accuracy confidence level for each of the first point-of-interest information and the second point-of-interest information in response to receiving the selection.

7. The apparatus according to claim 6, wherein the apparatus is further caused to direct presentation of the first point-of-interest information and direct to cease presentation of the second point-of-interest information in response to the accuracy confidence level of the first point-of-interest information exceeding a threshold value in response to receiving a selection for the first point-of-interest information.

8. The apparatus of claim 6, wherein the apparatus is further caused to identify a source of the selection and assign a weight factor to the selection in response to identifying the source.

9. The apparatus according to claim 8, wherein the apparatus is further caused to update the accuracy confidence level of each of the first point-of-interest information and the second point-of-interest information in response to receiving the selection, based at least in part on the weight factor of the selection.

10. The apparatus according to claim 6, wherein the accuracy confidence level for each of the first and second point-of-interest information is represented by a format chosen from the group consisting of at least one of a percentage, a pie-chart, a bar chart, a selection-count, a transparency level, a size, a level of prominence, or a color.

11. A computer program product comprising at least one non-transitory computer-readable storage medium having computer-executable program code instructions stored therein, the computer-executable program code instructions comprising:
program code instructions for providing first point-of-interest information associated with a location;
program code instructions for providing second point-of-interest information associated with the location, wherein the first point-of-interest information and the second point-of-interest information are mutually exclusive;
program code instructions for providing an accuracy confidence level for each of the first point-of-interest information and the second point-of-interest information;
program code instructions for receiving a selection of one of the first point-of-interest information or the second point-of-interest information, wherein the selection indicates that the selected one of the first point-of-interest information or the second point-of-interest information is accurate; and
program code instructions for updating the accuracy confidence level for each of the first point-of-interest information and the second point-of-interest information in response to receiving the selection.

12. The computer program product of claim 11, further comprising program code instructions for identifying the source of the selection and assigning a weight factor to the selection in response to identifying the source.

13. The computer program product according to claim 11, further comprising program code instructions for updating the accuracy confidence level of each of the first point-of-interest information and the second point-of-interest information in response to receiving the selection, based at least in part on the weight factor of the selection.

14. The computer program product according to claim 11, wherein the accuracy confidence level of each of the first and second point-of-interest information is represented by a format chosen from the group consisting of at least one of a percentage, a pie-chart, a bar chart, a selection-count, a transparency level, a size, a level of prominence, or a color.

\* \* \* \* \*